United States Patent [19]

Grossart

[11] Patent Number: 4,574,489
[45] Date of Patent: Mar. 11, 1986

[54] WHEEL ALIGNMENT GAUGE

[75] Inventor: Peter S. K. Grossart, Braunston, Nr Daventry, England

[73] Assignee: V L Churchill Limited, Daventry, England

[21] Appl. No.: 718,437

[22] Filed: Apr. 1, 1985

[30] Foreign Application Priority Data

Apr. 4, 1984 [GB] United Kingdom ............... 8408619

[51] Int. Cl.⁴ ............................................. G01B 5/255
[52] U.S. Cl. ............................ 33/203.18; 33/180 AT
[58] Field of Search ........... 33/203.18, 203.15, 203.16, 33/203.17, 203, 180 AT, 288, 203.14, 203.19

[56] References Cited

U.S. PATENT DOCUMENTS 4,011,659  3/1977  Hörvallius .................. 33/203.18
4,408,399  10/1983  Darwood et al. ............ 33/203.18

Primary Examiner—Willis Little
Attorney, Agent, or Firm—Kemon & Estabrook

[57] ABSTRACT

In a wheel alignment gauge for a vehicle, correction for buckling or other lack of truth in the wheel is made by fastening the gauge to the wheel, mounting indicating apparatus onto a spindle and articulating the spindle about an axis to bring the spindle into alignment with, or parallel to, the wheel axle.

3 Claims, 3 Drawing Figures

WHEEL ALIGNMENT GAUGE

This invention relates to wheel alignment gauges, such as are used, for example, to measure the relative angles of two wheels on a vehicle, or of one wheel relative to another part of a vehicle.

One form of such wheel alignment gauges is described and shown in our United Kingdom Patent application No. 2090988 published July 21, 1982. One source of error in measuring the angles arises when the wheel being measured does not run true on the axle about which the wheel rotates when in use. For example, the wheel may be buckled through damage or incorrect manufacture.

In said Patent Application, a procedure is described by which the error due to lack of truth in the wheel can be reduced. However, we have found that the improvement described herein has certian advantages over that procedure.

According to the present invention there is provided a wheel alignment gauge, for use in comparing the relative angular position of a vehicle wheel with another part of the vehicle, including locating means for locating the gauge to a predetermined plane of the wheel, near to a plane normal to the axle of the wheel, indicator means rotatable on the locating means around an axis approximately parallel to said axle, and angular adjustment means connecting the indicator means to the locating means, whereby the said axis may be brought parallel to or coincident with the wheel axle.

Preferably the wheel alignment gauge includes a first body rotatable on the locating means about a second axis normal to the predetermined plane, a second body adjustably rotatable on the first body about a third axis parallel to the predetermined plane, the indicator means being pivotted to the second body about the first-mentioned axis.

The invention is described, by way of example only, with reference to the accompanying drawings, in which.

Figure 1:
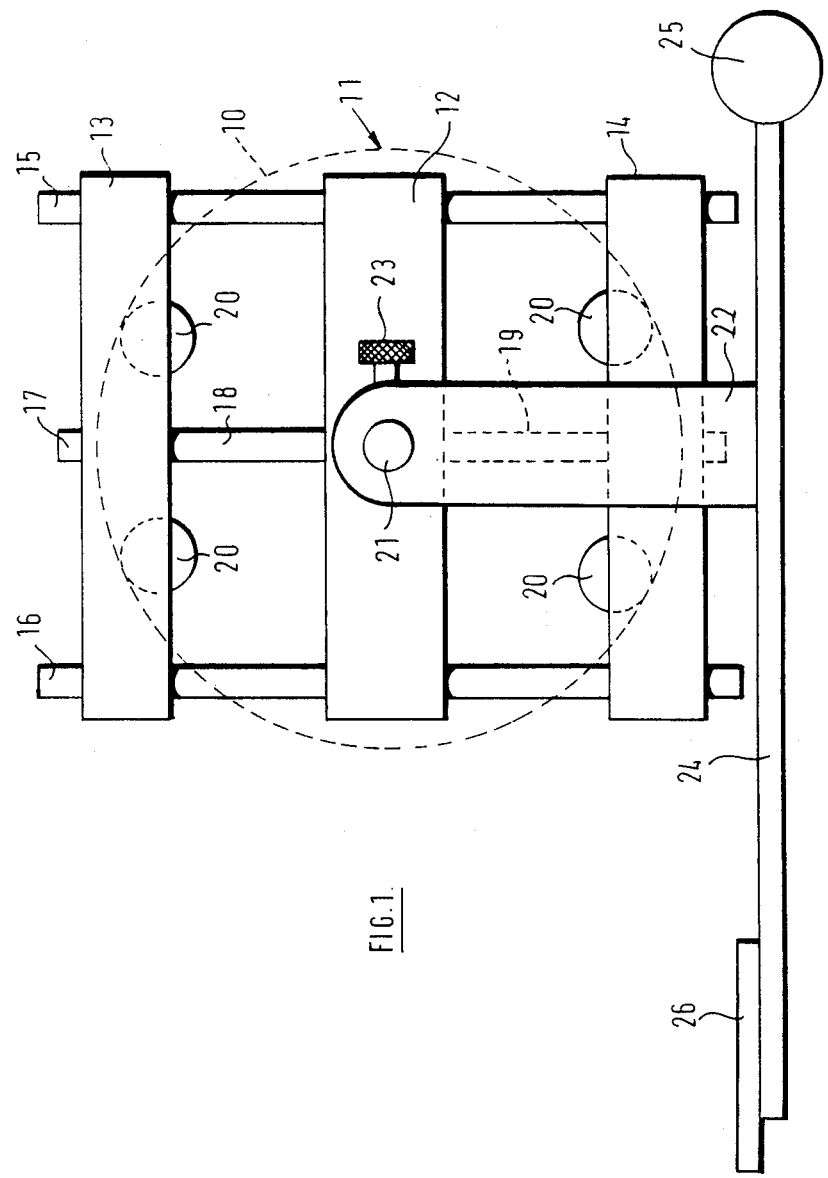
FIG. 1 is an elevation at reduced scale of a wheel alignment gauge in use.

In FIG. 1, a vehicle wheel of which certain angles such as toe-in or toe-out are to be measured, is indicated generally at 10. A wheel alignment gauge is indicated generally at 11. Normally two such gauges 11 are used, one on each wheel of a pair at the front or at the rear of a vehicle. The gauges 11 are generally indentical except that they are of opposite hand.

Each gauge 11 includes parallel beams 12, 13, 14. The beam 12 has two parallel rods 15, 16 fastened therein adjacent the ends of the beam 12 and extending normal thereto. The beams 13, 14 are slidible along the rods 15, 16 so as to be parallel to the beam 12. A screw 17 is rotatable in the beam 12 but axially located thereto. The screw 12 has respective left-and right-hand threaded portions 18, 19 engaged in correspondingly threaded parts of the beams 13, 14. Rotation of the screw 17 moves the beams 13, 14 along the rods 15, 16 so that the beams 13, 14 remain equidistant from the beam 12.

The beams 13 and 14 have buttons 20 adjacent the ends thereof. The buttons 20 are shaped to engage in the rim of the wheel 10. Thus, by rotating the screw 17, the beams 13 and 14 are moved apart until all the buttons 20 engage in the wheel rim to locate the gauge 11 to the wheel 10 and to fasten it there.

A spindle 21 protrudes generally perpendicular to the beam 12 and a removable drop arm 22 is pivotted on the spindle 21 and retained thereon by a locking screw 23. An arm 24 is fastened to the bottom of the drop arm 22 and has a balance weight 25 at one end and at the other end has angle indicating apparatus 26 (not described further) protruding past the circumference of the wheel 10. When the apparatus described so far is used, the wheel 10 stands on rollers so that it may be rotated about its axle. Without going further into the detailed operation and use of the indicating apparatus 26, it is sufficient to state that if the rim of the wheel 10 is not true to the wheel axle, the angle reading on the indicating apparatus 26 will vary between a maximum and a minimum value for each revolution of the wheel 10. It is required to reduce or eliminate this variation in reading.

Figure 2:
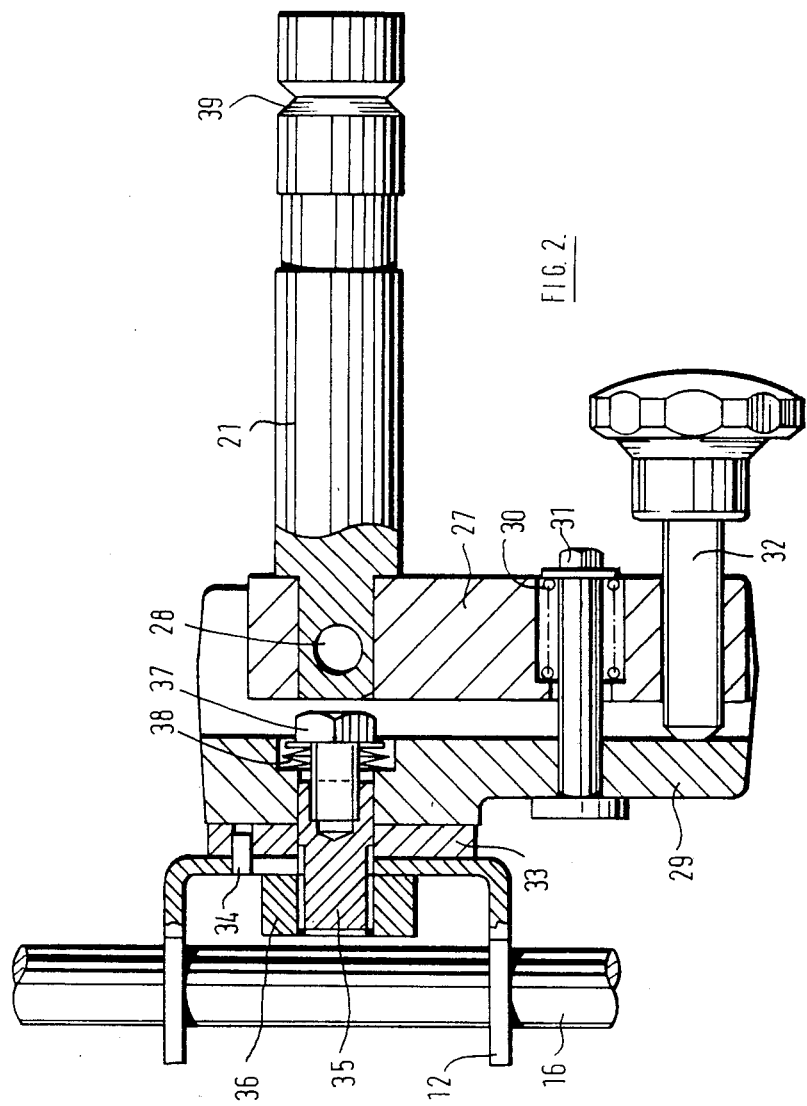
FIG. 2 is a section of part of FIG. 1.
Figure 3:
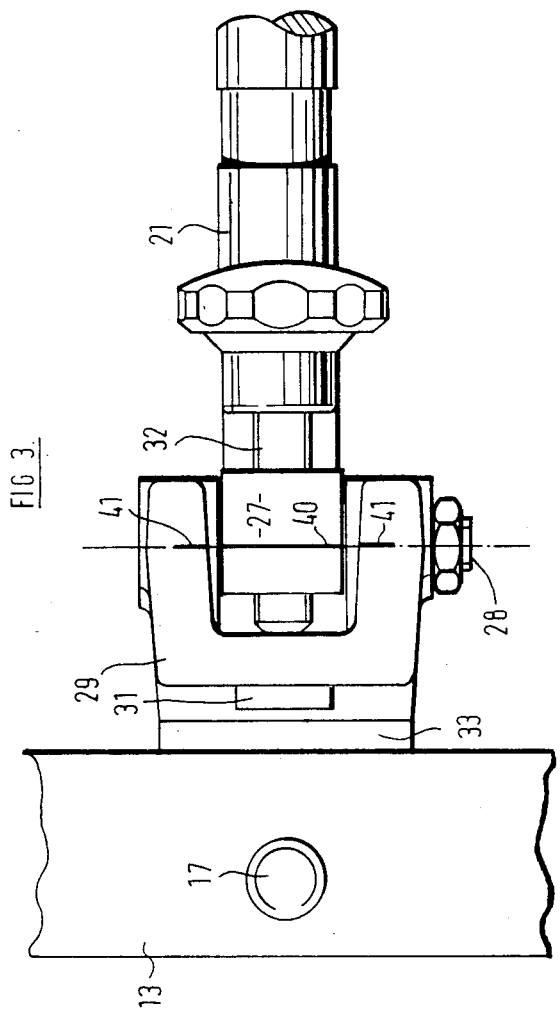
FIG. 3 is an elevation of the part shown in FIG. 2.

In FIGS. 2 and 3, the spindle 21 is fastened into a lever 27 which is pivotted on a pin 28 to a carrier 29. The lever 27 is biased towards the carrier 29 by a compression spring 30 located in a recess and bearing against a pin 31 through the carrier 29. The lever 27 is adjustably located to the carrier 29 by a manually adjustable screw 32, threaded in the lever 27 and abutting the carrier 29.

An abutment plate 33 is located against the beam 12 by a dowel 34, screw 35 and nut 36. The carrier 29 is held against the abutment plate 33 by a screw 37 and spring washer 38, so that the carrier 29 can be rotated manually around the screw 35. The end of the locking screw 23 enters a groove 39 in the spindle 21. Lines 40, 41 scribed on the end of the lever 27 and carrier 29 are arranged to be aligned when the axis of the spindle 21 is aligned with the axis of the screw 35 and is thus normal to the plane of the abutment plate 33 and to the plane defined by the buttons 20.

To use the apparatus described so far, the gauge 11 is held against the wheel 10 and screw 17 is rotated until the buttons 20 are engaged in the rim of the wheel 10, to locate and fasten the gauge 11 to the wheel 10. The drop arm 22 is slid onto the spindle 21 and the locating screw 23 is rotated until its pointed end locates in the groove 39, whilst allowing the drop arm 22 to swing freely on the spindle 21. A similar procedure is used on the gauge 11 on the other wheel 10 of the pair being measured. The usual cord, rod or spring is fitted between the two indicators 26 to connect them for operation, in known manner.

Considering one wheel 10 only, the screw 32 is rotated to align the lines 40, 41. The wheel 10 and the gauge 11 attached thereto are rotated through at least one complete revolution about the axle of the wheel, the drop arm 22 meanwhile continuing to hang down by virtue of its rotational freedom on the spindle 21. The total range of angular movement shown on the indicator 26 is noted and the wheel 10, gauge 11 etc. is rotated to the position where the reading on the indicater 26 is a maximum. The wheel 10 is held at that position while the carrier 29 is rotated around the screw 35 until the pin 28 is vertical, thus allowing the lever 27 to be moved relative to the carrier 29 in a horizontal plane only. The adjusting screw 32 is then rotated until the angular movement thereby induced on the indicator 26 is equal to half the range of angular movement previously noted, i.e. the indicator 26 is then at the mid-point of the said range.

When the wheel 10 and all the components carried thereby (except the drop arm 22 and parts fastened thereto) are rotated about the wheel axle there should then be no change in the reading on the indicator 26. Thus, the axis of the spindle 21 must have been brought into coincidence with, or parallel to, the axis of the wheel axle.

Although the invention has been described as applied to two wheels on a vehicle, it could be used in situations where the angular relation is required between one wheel and another part of the vehicle.

I claim:

1. A wheel alignment gauge, for use in comparing the relative angular position of a vehicle wheel with another part of the vehicle, including locating means for locating the gauge to a predetermined plane of the wheel, near to a plane normal to the axle of the wheel, indicator means rotatable around a first axis approximately parallel to said axle, wherein the improvement comprises a first body rotatable on the locating means about a second axis normal to the predetermined plane, a second body adjustably rotatable on the first body about a third axis parallel to the predetermined plane, the indicator means being pivoted to the second body about said first axis, whereby said first axis is brought parallel to or coincident with the wheel axle.

2. A wheel alignment gauge, as in claim 1, wherein the improvement comprises an angular indication of the relative positions of the first and second bodies at which said first axis and said second axis are aligned or parallel.

3. A method of using a wheel alignment gauge for comparing the relative angular position of a vehicle wheel with another part of the vehicle, the gauge including locating means for locating the gauge to a predetermined plane of the wheel, near to a plane normal to the axle of the wheel, indicator means rotatable around a first axis approximately parallel to said axle, a first body rotatable on the locating means about a second axis normal to the predetermined plane, a second body adjustably rotatable on the first body about a third axis parallel to the predetermined plane, the indicator means being pivoted to the second body about said first axis, whereby said first axis is brought parallel to or coincident with the wheel axle, the method including moving the locating means until the gauge is thereby fastened to the wheel, connecting the indicator means to a datum on the vehicle, wherein the improvement comprises rotating the second body about the third axis until said first axis and said second axis are aligned, rotating the wheel and the gauge together, noting the total range of angular movement shown on the indicator means, rotating the wheel and gauge together to the position where the reading on the indicator means is a maximum, at that position rotating the first body about said second axis until said third axis is vertical and moving the second body relative to the first body about said third axis until the angular movement thereby induced on the indicator means is equal to half the range of angular movement previously noted.

* * * * *